(No Model.)
R. S. MUDFORD.
Gin Saw Sharpener.
No. 230,489. Patented July 27, 1880.
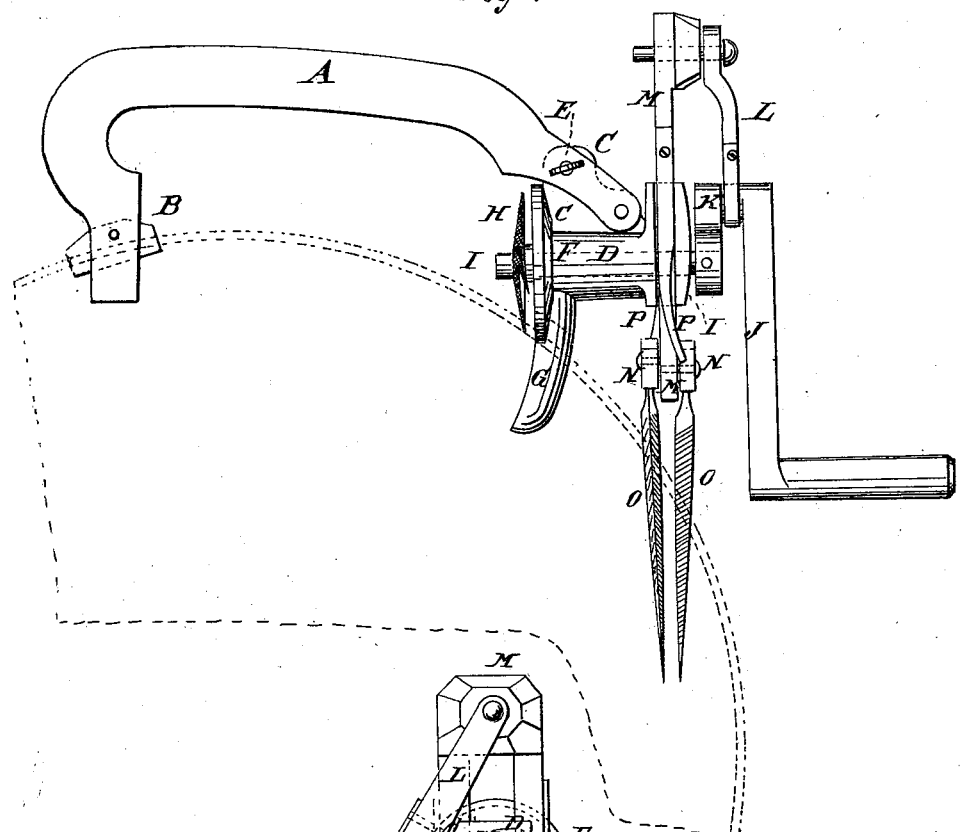
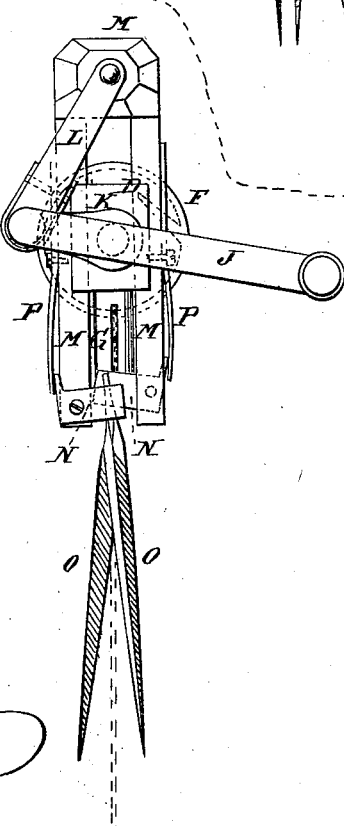
WITNESSES:
Chas. Nida
C. Sedgwick
INVENTOR:
R. S. Mudford
BY Munn & Co.
ATTORNEYS.
N. PETERS, PHOTO-LITHOGRAPHER, WASHINGTON, D. C.

UNITED STATES PATENT OFFICE.

ROBERT S. MUDFORD, OF TEXARKANA, ARKANSAS.

GIN-SAW SHARPENER.

SPECIFICATION forming part of Letters Patent No. 230,489, dated July 27, 1880.

Application filed March 6, 1880. (No model.)

*To all whom it may concern:*

Be it known that I, ROBERT S. MUDFORD, of Texarkana, Miller county, Arkansas, have invented a new and useful Improvement in Gin-Saw Sharpeners, of which the following is a specification.

Figure 1 is a side elevation of the improvement, and Fig. 2 is an end elevation.

Similar letters of reference indicate corresponding parts.

The object of this invention is to improve the construction of the gin-saw sharpeners for which Letters Patent No. 20,933 were granted to A. H. Burdin, July 20, 1858, in such a manner that they will bring the teeth to a better condition than the said machines as heretofore constructed.

The invention consists in the combination, with the hollow cylinder, the shaft that carries the circular file, and its crank, of the two files and their supporting and operating mechanism, as set forth.

A is a curved bar, in the forward end of which is formed a slot to receive the edge of the saw to be sharpend, and in which slot is pivoted a grooved shoe, B, to rest and slide upon the saw-teeth. The rear end of the bar A is slotted to receive a flange, C, formed upon the hollow cylinder D, and is pivoted to the said flange, so that the machine by turning the bar A upon its pivot can be adjusted to cause the circular file hereinafter described to give any desired inclination to the edges of the saw-teeth. E is a set-screw which passes through one side of the slotted end of the bar A, and bears against the side of the flange C to lock the said bar A in place when adjusted. The forward end of the hollow cylinder D has a circular flange, F, formed upon it, and upon its lower side is formed a downwardly-projecting arm, G, which is slotted longitudinally to receive the saw. The slotted forward end of the bar A and the slotted arm G prevent the machine from having a lateral movement and keep it in the same vertical plane with the saw while it is fed forward by the circular file in the manner hereinafter described, the machine being wholly supported by the saw. H is a circular file, which has a slit formed in one side, and is bent slightly to one side at one side of the said slit to form a lip, which lip at each revolution of the said file engages with the next tooth of the saw and acts as a screw to feed the machine forward one tooth. The file H is attached at its center to the forward end of a shaft, I, which passes through and revolves in the cavity of the hollow cylinder D.

To the outer end of the shaft I is rigidly attached a double crank, J K. The outer part, J, of the double crank is grasped by the operator in operating the machine.

To the inner part, K, of the double crank is pivoted the end of the short connecting-rod L, the other end of which is pivoted to the upper end of a bar, M. The bar M is slotted longitudinally, so that its side parts or arms will slide in grooves in the opposite sides of the enlarged or flanged outer part of the hollow cylinder D. To the opposite or reverse sides of the lower ends of the arms of the slotted bar M are pivoted the outer ends of two blocks, N, the inner ends of which overlap each other, and are at a distance from each other equal to the thickness of the bar M.

To the inner parts of the blocks N are attached the tangs of the files O. Against the outer ends of the pivoted blocks or file-holders N, or against short arms formed upon or attached to the said ends, rest the lower ends of springs P, the upper ends of which are attached to the bar M, and which may be adjusted by set-screws to cause the files O to bear more or less strongly against the saw-teeth.

The mechanism is so arranged by placing the inner part, K, of the double crank upon the opposite side of the shaft I from the slit in the circular file H that the files O will be raised from the saw at the time that the circular file H moves the machine forward from one tooth to another upon the saw, so that the said files O will not interfere with the said forward movement of the machine.

By this construction the files O will round or smooth off the edges of the saw-teeth left square by the file H, and thus leave them in better condition to do their work.

Having thus described my invention, I claim as new and desire to secure by Letters Patent—

1. In a gin-saw sharpener, the combination, with the hollow cylinder D, the crank J, and the shaft I, that carries the circular file H, of the crank K, the connecting-rod L, the slotted bar M, the pivoted holders N, the files O, and the springs P, substantially as herein shown and described, whereby the edges of the saw-teeth filed square by the circular file H will be rounded off, as set forth.

2. In a gin-saw sharpener, the combination, with the slotted bar M and the holders N, that carry the files O, of the springs P, for regulating the pressure of the files O against the saw-teeth, as set forth.

ROBERT SAMUEL MUDFORD.

Witnesses:
WILLIAM R. KELLEY,
JOHN A. ROBERTS.